United States Patent
Krauss (10) Patent No.: US 11,501,181 B2
(45) Date of Patent: Nov. 15, 2022

(54) POINT-AND-SHOOT ANALYTICS VIA SPECULATIVE ENTITY RESOLUTION

(71) Applicant: International Business Machines Corporation, Armonk, NY (US)

(72) Inventor: Kirk J. Krauss, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 618 days.

(21) Appl. No.: 15/428,362

(22) Filed: Feb. 9, 2017

(65) Prior Publication Data

US 2018/0225577 A1    Aug. 9, 2018

(51) Int. Cl.
*G06N 5/02* (2006.01)
*G06Q 10/06* (2012.01)

(52) U.S. Cl.
CPC .......... *G06N 5/025* (2013.01); *G06Q 10/063* (2013.01)

(58) Field of Classification Search
CPC ............................. G06N 5/025; G06Q 10/063
See application file for complete search history.

(56) References Cited

U.S. PATENT DOCUMENTS

| | | | |
|---|---|---|---|
| 8,326,788 B2 | 12/2012 | Allen et al. | |
| 9,170,117 B1* | 10/2015 | Abuelsaad | B64C 39/024 |
| 2005/0021488 A1* | 1/2005 | Agrawal | G06F 17/18 |
| 2010/0161542 A1 | 6/2010 | Caceres | |
| 2013/0054598 A1 | 2/2013 | Caceres | |
| 2014/0052685 A1 | 2/2014 | Adair | |
| 2014/0278210 A1* | 9/2014 | Krauss | G01B 21/04 702/150 |
| 2015/0052151 A1* | 2/2015 | Krauss | G06F 16/29 707/748 |
| 2016/0210317 A1 | 7/2016 | Krauss | |

OTHER PUBLICATIONS

Sun, Chenchen, et al. "A genetic algorithm based entity resolution approach with active learning." Frontiers of Computer Science 11.1 (2017): 147-159. (Year: 2017).*
Sun, Chenchen, et al. "A genetic algorithm based entity resolution approach with active learning." Frontiers of Computer Science 11.1 (2017): 147-159. (Year: 2017).*

(Continued)

*Primary Examiner* — Michael J Huntley
*Assistant Examiner* — Sehwan Kim
(74) *Attorney, Agent, or Firm* — Caleb D. Wilkes (57) ABSTRACT

An embodiment of the invention provides a method to determine relationships between entities where an interface receives a first data set representing observations of a first entity and observations of a second entity, and a second data set representing a relationship between the first entity and the second entity. An entity analytics engine applies a first candidate rule to the first data set to generate a first candidate relationship between the first entity and the second entity. A processor determines whether according to a criterion the first candidate relationship matches the relationship represented in the second data set. The entity analytics engine replaces the first candidate rule with a second candidate rule when the first candidate relationship does not match the relationship represented in the second data set.

20 Claims, 5 Drawing Sheets

(56) References Cited

OTHER PUBLICATIONS

Sun, Chenchen, et al. "ERGP: A combined entity resolution approach with genetic programming." 2014 11th web information system and application conference. IEEE, 2014. (Year: 2014).*

Bischof, Jonathan, and Edoardo M. Airoldi. "Summarizing topical content with word frequency and exclusivity." Proceedings of the 29th International Conference on Machine Learning (ICML-12). 2012. (Year: 2012).*

Salvador, Stan, Philip Chan, and John Brodie. "Learning States and Rules for Time Series Anomaly Detection." FLAIRS conference. 2004. (Year: 2004).*

Kobayashi, Ichiro, and Naoko Okumura. "Text Generation for Explaining the Behavior of 2D Charts: With an Example of Stock Price Trends." NTCIR. 2008. (Year: 2008).*

Schormann, Steve, "IBM Business Analytics Proven Practices: SPSS Modeler Premium Entity Analytics Technical Q&A", Sep. 3, 2014, pp. 1-8.

Bengfort, Benjamin, "Entity Resolution for Big Data", Aug. 15, 2013, pp. 1-9, retrieved from <http://www.datacommunitydc.org/blog/2013/08/entity-resolution-for-big-data> on Feb. 9, 2017.

* cited by examiner

POINT-AND-SHOOT ANALYTICS VIA SPECULATIVE ENTITY RESOLUTION

FIELD OF THE INVENTION

The present invention relates to systems, methods, and computer program products for point-and-shoot analytics via speculative entity resolution.

BACKGROUND

Entity resolution applications typically perform one or both of entity resolution and relationship resolution. Entity resolution attempts to answer the question "Who is who?"—i.e., to determine whether multiple data records refer to an identical physical entity or different physical entities. For example, data records identifying women with different last names may in fact refer to the same woman having both a familial surname and a married surname. Relationship resolution attempts to answer the question "Who knows whom?" in order to determine benefits and/or risks associated with relationships identified among entities, such as customers, employees, vendors, and so forth, e.g., by cross-referencing data from various sources. For example, a relationship may be identified between two individuals sharing a common address or telephone number.

SUMMARY OF THE INVENTION

An embodiment of the invention provides a method for point-and-shoot analytics via speculative entity resolution. An interface receives a first data set including observations of a first entity and observations of a second entity, and a second data set including data indicative of a specific relationship between the first entity and the second entity. A first candidate rule is selected from a list relevant to the observations of the first entity and the observations of the second entity. An entity analytics engine applies the first candidate rule to the first data set to generate a first candidate relationship between the first entity and the second entity A processor determines whether according to a criterion the first candidate relationship matches the relationship represented in the second data set. The criterion includes a determination of the specific relationship between the first entity and the second entity. A second candidate rule is generated by modifying the first candidate rule; and, the entity analytics engine replaces the first candidate rule with the second candidate rule when the first candidate relationship does not match the relationship represented in the second data set.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides a system and method for point-and-shoot analytics via speculative entity resolution. For example, an entity resolution engine can be applied to identify interactions among ocean-going vessels based on their motion, using rules involving geospatial coordinates, vessel capacities, and the like. It is also possible that the same entity resolution engine can be applied to detect voter registration fraud using rules involving anonymized names of individuals, home and work addresses, and the like.

The entity resolution engine can resolve entities by attempting to match observed entities with previously observed entities. Entities such as ships may be matched based on comparison of their features, such as capacities or countries of origin, and feature elements, such as tonnages or cubic meters. The rules that drive the entity resolution engine can be derived from a few basic concepts concerning entity features. The concepts can include: the frequency of entities per their occurrence (e.g., "Can a ship have more than one actual capacity?" or "Can it have more than one crew member?"); the exclusivity of their occurrences per entity (e.g., "Can a given capacity apply to more than one ship?" or "How about a given vessel name?"); their stability over time (e.g., "Does a ship have one capacity during one timeframe and another capacity during another timeframe?" or "Can it have one captain this voyage and a different captain next voyage?"); and/or functional dependency (e.g. "If a first ship has a certain first capacity, must a second ship then have a certain second capacity?" or for a case where functional dependency may be more meaningful, "If a fleet has three ships on the water and three captains, and the first two captains are in charge of two of the ships, may it follow that the third captain is in charge of the other (or third) ship?"). The system can automate the process of deriving a useful set of entity resolution rules for a given use case and/or a changing scenario.

At least one embodiment of the invention provides a rule set generator that applies heuristics or a machine learning system to entity resolution outcomes based on selected candidate rules relevant to a set of entity observations. Via an iterative process, the entity resolution outcomes can be checked against expected outcomes. The candidate rules can be modified autonomously until the outcomes match criteria about the expected relationships.

The criteria can include determined identity relationships and specific entity resolutions, as well as specific relationships of other types (besides identity) among the entities. The criteria can comprise one or more acceptable ranges reflecting the number of expected relationships/resolutions to be determined for the set of observations.

In at least one embodiment, the only user input that is needed is a set of inbound observations, along with an expected number of resolutions to be found for those observations. The rule set generator can determine rules that will achieve that number of resolutions over those inbound observations. Hints can be passed in to indicate which entities should be resolved and which other types of relationships should be found, among specific entities in the inbound set.

A rule set generator can receive data representing a situation where relationships among observed entities can be programmatically determined. The rule set generator can also receive input criteria describing either (a) actual relationships among those entities or (b) the number and type of relationships expected among those entities (e.g., a percentage of identity relationships identified among those entities, or a number representing a base or limit on the number of "has a" relationships among those entities; many other examples of criteria are possible). By iteratively applying candidate rule sets to arrive at entity analytics outcomes, and by comparing those outcomes with the input expectations, the rule set generator can determine a best fitting rule set, or at least a sufficient rule set.

A candidate rule set may be initially selected by entity class (e.g., cargo vessels, commercial passenger vessels, commercial fishing vessels, private fishing vessels, or naval vessels) from a list relevant to a broad set of entity classes. The list can include entities of the class being observed (among potentially other, irrelevant entity classes). An entity analytics engine can apply the candidate rule set to representative observations, then the rule set generator can compare the outcome to the expected relationship findings, that is, criteria (a) or (b) described above. If according to the criteria the outcome does not match the expectations, then one or more rules in the candidate rule set can be modified to generate a new candidate rule set. The entity analytics engine can be applied again; and, the outcome can be compared with expectations again. This process may iterate until the criteria are satisfied.

The candidate rule set may be autonomously modified based on heuristics. Alternatively, the candidate rule set may be autonomously modified via a machine learning system trained via repeating applications of rule sets, either in pre-production training, or client-side training, or both. The heuristics can be selected by entity class and can derive an expected outcome based on a predefined graph of frequency vs. exclusivity for features of the class.

Figure 1:
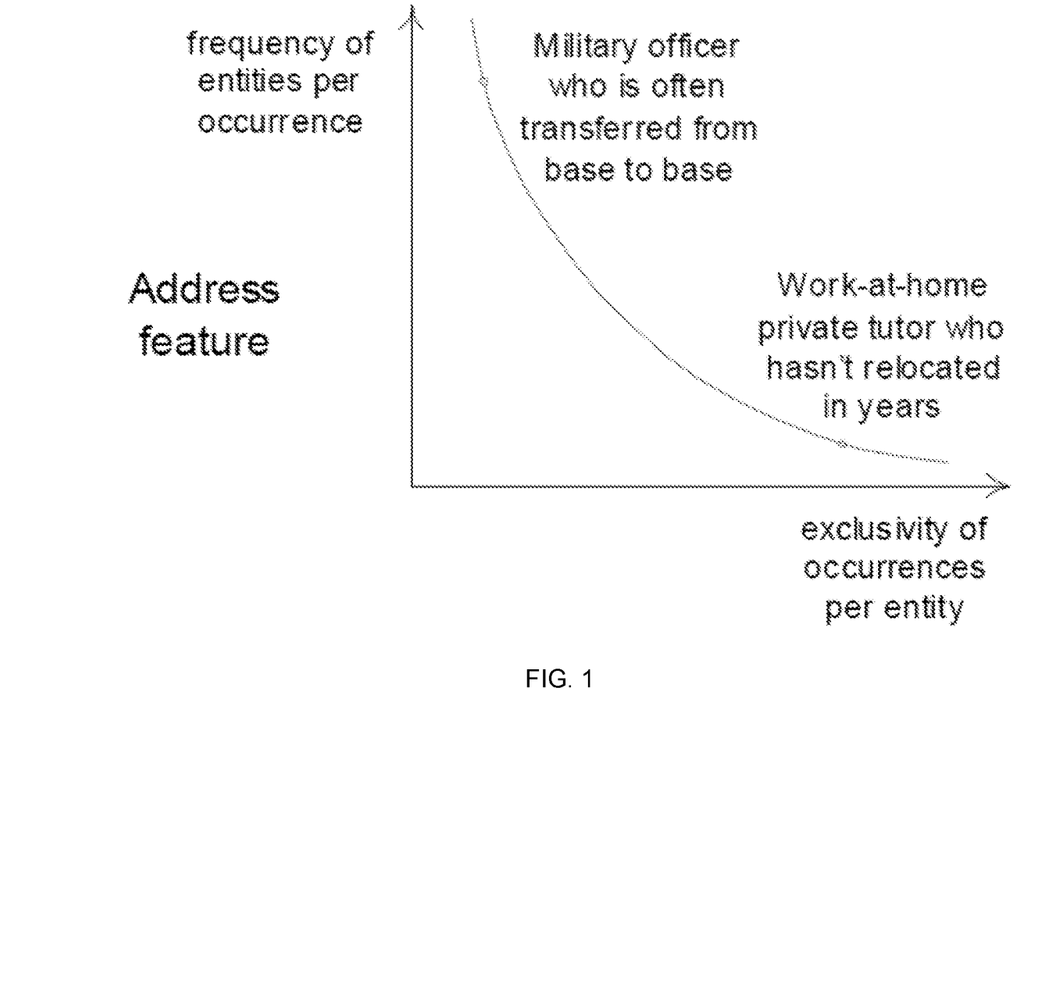
FIG. 1 is a graph illustrating frequency versus exclusivity for a mailing address feature of a rule according to an embodiment of the invention.

For example, as illustrated in FIG. 1, the graph for the feature "mailing address" of an entity of the "person" class might be predefined to follow a curve where high frequency always indicates low exclusivity and vice-versa. In other words, as the frequency of entities for occurrence increases, the exclusivity of occurrences per entity decreases and vice-versa, in this example. A military officer who is often transferred from base to base is an example of a person entity with high frequency and low exclusivity for the entity feature "mailing address". A work-at-home private tutor who has not relocated in years is an example of an entity with low frequency and high exclusivity for the entity feature "mailing address".

In an entity analytics engine, frequency and exclusivity are not necessarily either-or options but may instead reflect ranges, for instance between 0 (no exclusivity) and 1 (total exclusivity). These 0-1 values provide an example; alternatively, various other ranges may be used. The curve in the graph illustrated in FIG. 1 may be specific to mailing addresses; different entity features may be associated with different curves. For example, a graph for a "number of toes" entity feature may be represented by a line rather than a curve. In another example, the graph may break down into multiple lines, such as a reptile line and a mammal line, where rhinoceroses are not in the same position on the mammal line as monkeys.

The criteria may indicate a specific relationship that can be determined, or a range of acceptable numbers and types of relationship, or both. In any case, once a rule set is found that results in outcomes that match the criteria, the rule set can be deployed as the rule set for actual analytics. The rule set can be changed on the fly, via further iterations of the rule set generation process, if entity relationship determination begins to go wrong during a production run. Some rules might be determined as entity resolution is progressing, based on a feature correlation graph for the observed entities.

Figure 2:
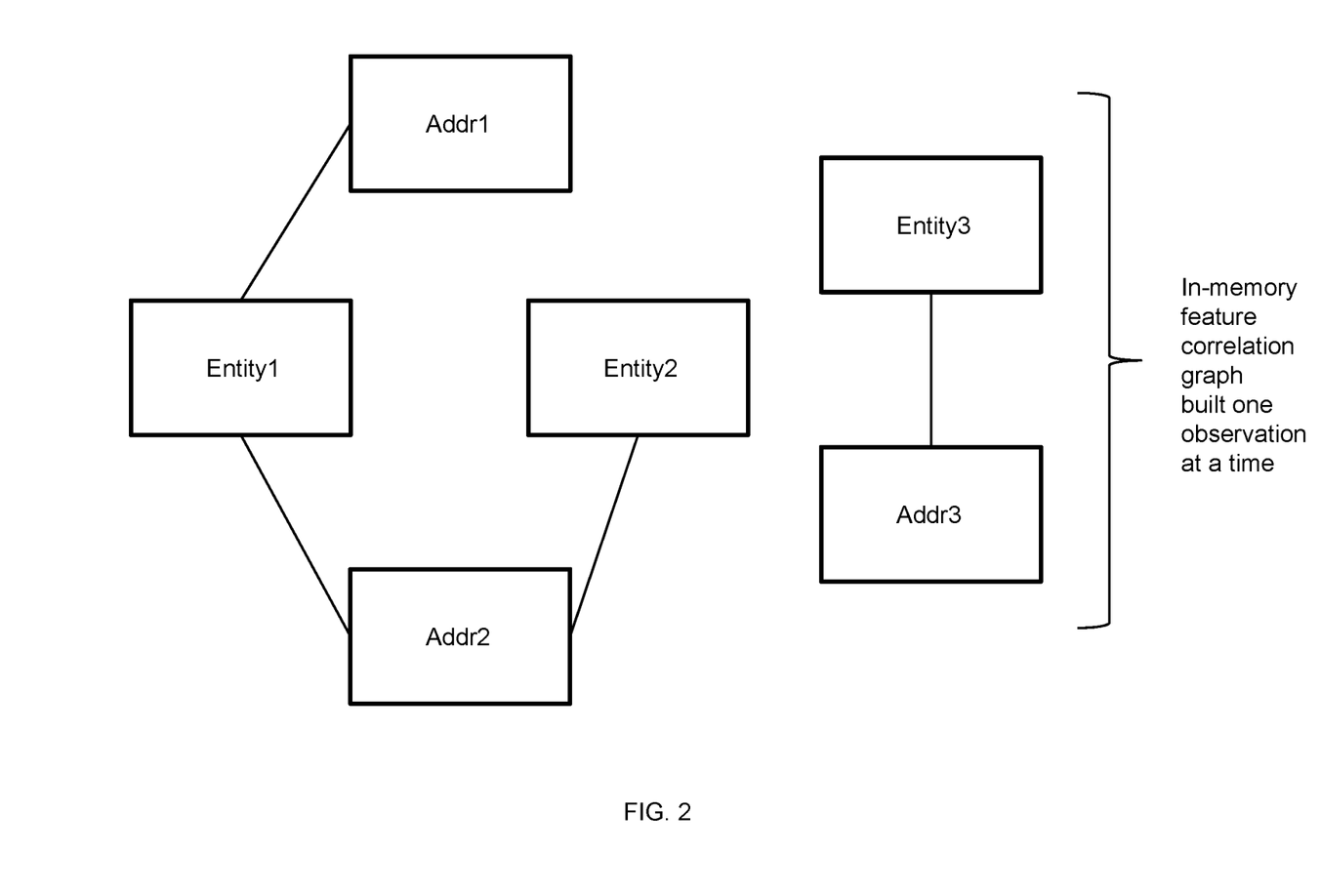
FIG. 2 is a diagram illustrating relationship data between entities and mailing addresses according to an embodiment of the invention.

FIG. 2 illustrates relationship data involving three entities and three mailing addresses, where entities are found that are associated with single or multiple addresses, and addresses are found that are associated with single or multiple entities. For example, Entity 1 has lived at Address 1 and Address 2; Entity 2 has lived at Address 2; and Entity 3 has lived at Address 3. If a first rule indicates that one or another of these scenarios is impossible, yet a second rule indicates that it must be possible based on reliability of the observational data, then the first rule can be immediately removed or modified in favor of the second rule, even as further inbound observations are in the pipeline.

The initial candidate rule set for an entity class could be prearranged in order of trustworthiness. When a less trusted rule appears to be in conflict with a more trusted rule, the less trusted rule can be removed or modified in order to achieve a more favorable number of resolutions. An embodiment based on machine learning can involve training and statistical methods relevant to the frequency, exclusivity, and trust measures that have been outlined above in terms of heuristics.

A best fit embodiment can attempt to modify the rule set over and over, tracking the conformity of the resulting resolutions against the expectations. As rules are modified, resolutions may be either too optimistic or too pessimistic, in all or a majority of result sets. A best fitting outcome can be tracked, along with a count of attempted rule sets. The rule set that results in the best fitting outcome, among a number of attempts, can be saved as a candidate best fitting rule set. If a better fitting rule set is determined, it can be saved as the new candidate. After some configurable number of attempts, the rule set can be adopted for use. This embodiment may be used in conjunction with an embodiment that requires conformity with other input criteria, or it may be used on its own.

Figure 3:
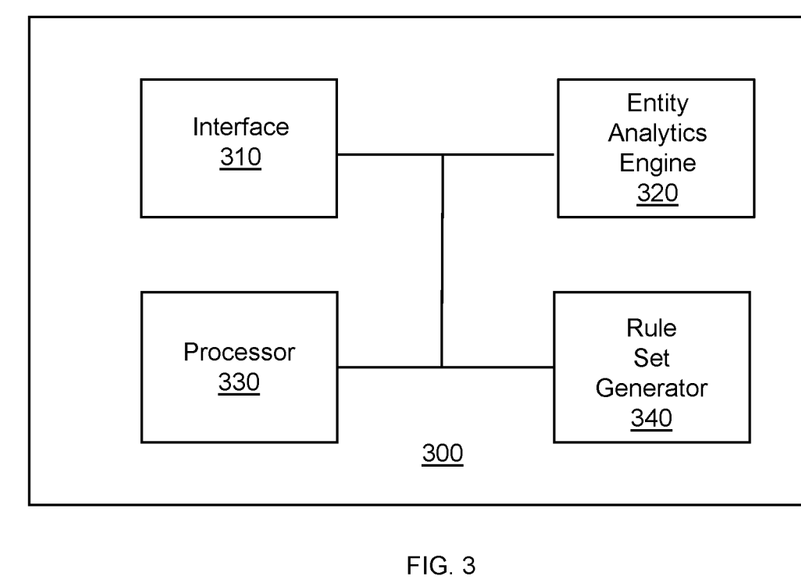
FIG. 3 illustrates a system for point-and-shoot analytics via speculative entity resolution according to an embodiment of the invention.
Figure 4:
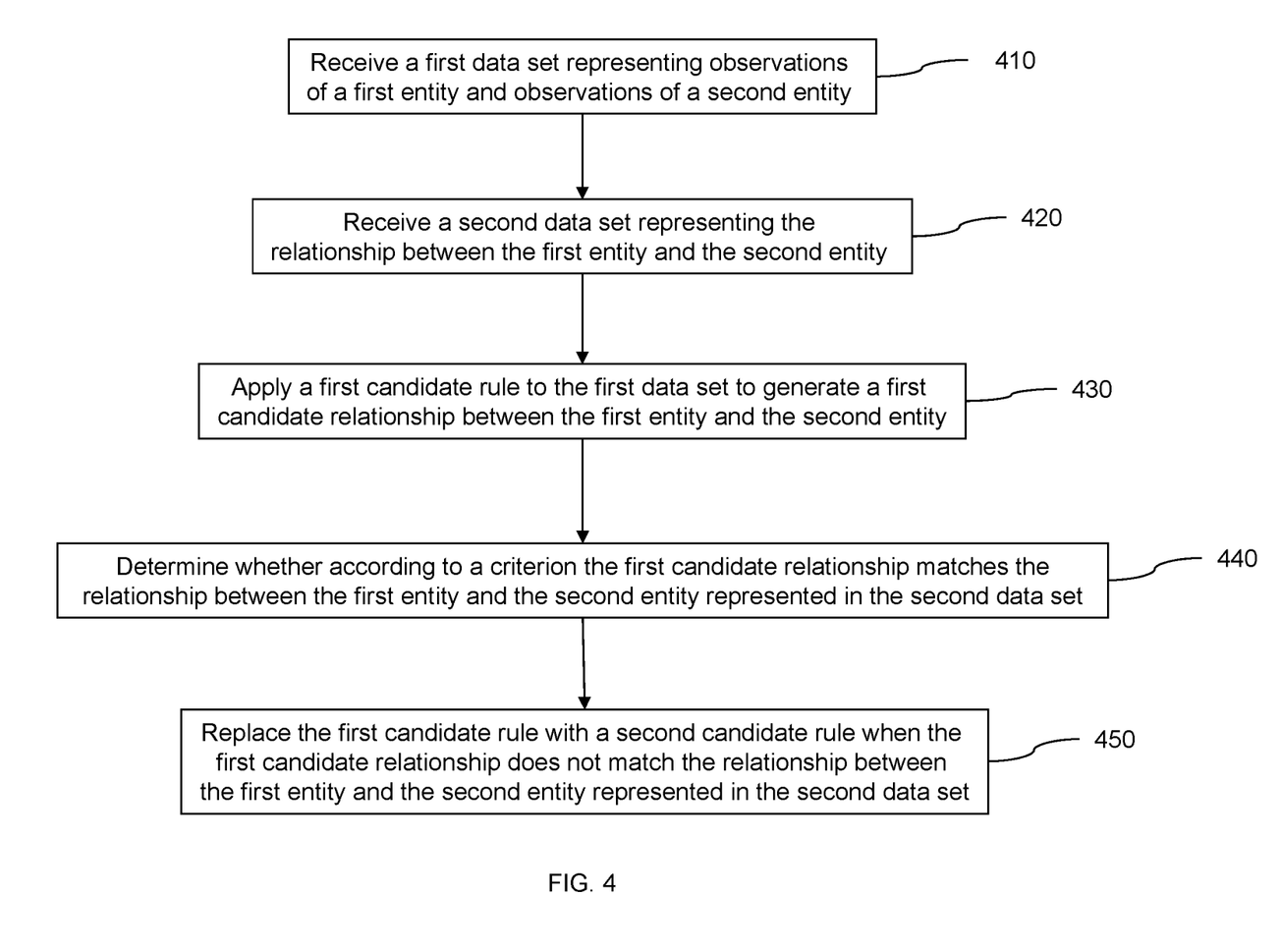
FIG. 4 is a flow diagram illustrating method for point-and-shoot analytics via speculative entity resolution according to an embodiment of the invention.

FIG. 3 illustrates a system 300 for point-and-shoot analytics via speculative entity resolution according to at least one embodiment of the invention. The system 300 can include an interface 310, an entity analytics engine 320, a processor 330, and a rule set generator 340. FIG. 4 is a flow diagram illustrating method for point-and-shoot analytics via speculative entity resolution (e.g., using the system 300) according to at least one embodiment of the invention.

The interface 310 can receive a first data set representing observations of a first entity and observations of a second entity, 410. For example, the first data set can include the GPS locations, observed speeds, headings, and/or identification numbers of Vessel A and Vessel B. The first data set can be obtained from satellites, radio towers, antennas, and/or sensors on Vessel A and/or Vessel B. In at least one embodiment, Vessel A and Vessel B are an identical entity (i.e., Vessel A is Vessel B). As used herein, the term "interface" includes a computer hardware device, such as, for example, an input port, an output port, an antenna, a keyboard, a mouse, a microphone, a touchpad, a touchscreen, a joystick, a controller, a camera, a disk drive, etc.

The interface 310 can also receive a second data set representing the relationship between the first entity and the second entity, 420. The relationship between the first entity and the second entity can be an identity relationship or other relationship, such as, for example, Vessel A and Vessel B are in the same class (e.g., commercial fishing boat, recreational sailboat, law enforcement boat) or in the same fleet. The relationship between the first entity and the second entity can be a behavioral relationship other than an identity relationship, such as, for example, the second data set includes Vessel A's heading relative to Vessel B, Vessel B's heading relative to Vessel A, Vessel A's position relative to Vessel B, Vessel B's position relative to Vessel A, and/or whether Vessel A and Vessel B have a crew member in common (as observed at different instances in time). In at least one embodiment, the relationship between the first entity and the second entity is no relationship.

The entity analytics engine 320 can apply a first candidate rule to the first data set to generate a first candidate relationship between the first entity and the second entity, 430. For example, the first candidate rule specifies that if two entities have in common crew member(s) listed on the manifests at different time frames, then the two entities belong to an identical fleet. In another example, if a fleet has three ships on the water and three captains, and the first two captains are in charge of two of the ships, then the third captain is in charge of the third ship. In yet another example, if two entities are of identical or closely matching weight and speed, then the two entities belong to the same class. In still another example, if a threshold number of entities share a mailing address based on a threshold number of observations, then the entities are family members. The rules can be an algorithm or a formula that is automatically generated by the system without human interaction or selected from a set of pre-existing rules.

The processor 330 can determine whether according to a criterion the first candidate relationship matches the relationship between the first entity and the second entity represented in the second data set, 440. In at least one embodiment, the second data set includes data indicative of a specific relationship, and the criterion is a determination of the specific relationship. In at least one embodiment, the second data set includes an acceptable range of quantities of relationships of a first type, and the criterion defines the acceptable range. The criterion can include the number of attempts to determine one or more rules.

The criterion can apply to either the entities themselves or to the results of entity analytics involving those entities. The criterion may be of an "is/are" or an "is not/are not" variety, or a "may" or "may not" variety, or a "has a" or "does not have a" variety, applicable to the entities. The criterion may be a range of allowable entity analytics outcomes. When a candidate rule is put to the test according to the criterion, outcomes for the candidate rule can be generated along the lines shown in the following examples. In the first example, the first and second entities are identical; thus a candidate rule that allows for them to be identical would meet the criterion; otherwise the candidate rule would not meet the criterion.

In another example, the first and second entities are related by a relationship other than identity; thus a candidate rule that does not allow for that relationship would not meet the criterion. In yet another example, an expected number of resolutions (findings of identity) involving the first and second entities is within a range; thus a candidate rule that would place these resolutions in the range would meet the criterion; otherwise the candidate rule would not meet the criterion.

In still another example, an expected number of findings of a select relationship other than identity involving the first and second entities (e.g., same entity class) is within a range; thus a candidate rule that finds more or fewer findings of the select relationship involving the first and second entities would not meet the criterion. In still yet another example, the first and second entities are not related; thus a rule that calls for finding of a relationship would not meet the criterion.

The entity analytics engine 320 can replace the first candidate rule with a second candidate rule when the first candidate relationship does not match the relationship between the first entity and the second entity represented in the second data set, 450. In at least one embodiment, the processor 330 selects the first candidate rule from a list relevant to the observations, and the rule set generator 340 generates the second candidate rule by modifying the first candidate rule. For example, when the observations include speeds and sizes of ocean-going vessels, then a candidate rule that includes speeds and sizes of ocean-going vessels (e.g., as factors in determining the identities of the entities) is relevant to the observations.

A candidate rule can be generated via a heuristic. For example, in an embodiment, entities of a "person" class can be associated with a set of prospective rules having parameters that may be selected or modified. The heuristic used for candidate rule generation can include an algorithm that matches a rule from the set to observed persons, and an algorithm that modifies the parameters. The person entity can have a "name" feature and an "address" feature, such that according to a first candidate rule, if some number of observations, over various time frames, of a person having an identical name are associated with an identical address, then the observed entities can be resolved, indicating that all of those observations reflect an identical person. The candidate rule can be a member of a set that includes other candidate rules, some of which may conflict with the first candidate rule. According to a second candidate rule, if some number of observations, over various time frames, of a person having an identical birth date are associated with an identical address, the observed entities can be resolved. The embodiment can apply one or both candidate rules to a prepared set of observations of persons and compare outcomes when the first candidate rule, the second candidate rule, and both the first and second candidate rules together are applied. The prepared data set can include a number of observations of twin siblings living together. The number of resolutions, when the second candidate rule is applied, may be overly optimistic according to input criteria according to which fewer resolutions are expected than the number resulting from the second candidate rule. The algorithm that matches a rule from the set to observed persons can compare the number of resolutions to the expected number and can reject the second candidate rule in favor of the first one. The algorithm that modifies the parameters of candidate rules can then be applied to the first candidate rule, to further improve the outcome to conform with the expected number of resolutions.

Continuing with the above example, in addition to the observations of twin siblings, the prepared data set may include observations of visiting persons who are observed at an address on occasion. The first candidate rule, in any form, may indicate that entity resolution requires a certain specific number of observations over certain specific time frames, where these certain specific numbers constitute parameters modifiable via the heuristic. The original form of the rule may indicate that if 17 observations, over 17 days, of a person having an identical name are associated with an identical address, then the observed entities can be resolved. However, the prepared data set may include observations of all person entities represented in the data set over an entire seventeen-day period. The algorithm that modifies the parameters can determine that the entity resolution outcome based on the seventeen-day form of the first candidate rule is somewhat pessimistic, with respect to the expected number of resolutions. The 17-observation requirement might be pessimistic, for instance, when persons are traveling away from their usual addresses for a portion of the 17-day period of the observations. The algorithm can attempt to "home in" on parameters that result in improved resolution outcomes with respect to the criteria, possibly by using a divide and conquer approach. That is, the algorithm can reduce one or both of the "17" parameters to "1", and attempt entity resolution over the prepared data set, from the start, to compare outcomes. The outcome in which the rule checks for 1 person to be observed 1 time may result in resolving visitors with non-visitors and may thus be overly optimistic. The algorithm can modify the "1" parameters to a number much greater than 1, but somewhat less than 17, and retry. The heuristic may repeat this parameter modification process until the rule fits with the expected resolution outcome to a threshold degree of accuracy, and then stop. Alternatively, the heuristic may continue the process to reach a "best fit" level of accuracy. Either way, a further selection of a further candidate rule may be applied, together with further use of the heuristic to tune that candidate rule, in an attempt to further improve entity resolution outcomes automatically. In this example, the parameters that comprise portions of candidate rules are described as numerical parameters, for ease of explanation. A person of skill in the art will realize that the aspects of a candidate rule that may be modified by the heuristic can include aspects other than numerical parameters, and that the heuristic can modify a candidate rule in a variety of ways that may be defined by the nature of the rule and by the operator or developer who provides a set of candidate rules for selection and modification via the heuristic.

The second candidate rule, and any further candidate rules, can be generated via a machine learning system or algorithm trained via repeating applications of rule sets. A machine learning system or algorithm can be trained to recognize aspects of rules similar to those described with respect to the heuristic example of the foregoing two paragraphs. A corpus of rules and resulting entity resolution outcomes can be used for training purposes. The trained system or algorithm can compare rules and known outcomes with the rules in a set of prospective rules and expected outcomes in order to select a candidate rule. Selection of modified parameters, or of other aspects of candidate rules that may be modified, may rely on a separate machine learning algorithm or system, or on a heuristic as described in the above paragraph. An embodiment based on machine learning can include training and statistical methods relevant to the frequency with which a resolvable entity can have a given feature, the exclusivity of a feature per entity, a frequency vs. exclusivity graph or curve applicable to one or more entity features, or other graphs or curves, or other aspects of entity features.

The second candidate rule set also can be generated via a cognitive computing system that can employ a variety of machine learning systems or algorithms. Each of the machine learning systems or algorithms on which the cognitive computing system relies can be trained to recognize aspects of rules similar to those described in the above examples. Further, each of the machine learning systems or algorithms can compare rules and known outcomes with the rules in a set of prospective rules and expected outcomes, and each can provide a confidence score, relevance score, or other score to indicate its confidence in any candidate rule it selects. The cognitive computing system can compare the rules and scores and make a determination as to which rule is associated with a relatively high degree of confidence, according to a reasonably determinative subset of the machine learning systems or algorithms. Selection of modified parameters, or of other aspects of candidate rules that may be modified, may rely on a separate set of machine learning algorithms or systems, or on a heuristic.

An embodiment can defer to a human operator for rule or rule parameter selection in the event that its confidence in a rule or rule parameter is insufficient to make a determination. An embodiment can provide the operator with results of candidate rules it has tried, along with information about the degrees of success with respect to those candidate rules. An embodiment can select certain rules, or rule parameters or other modifiable aspects of rules, on its own and can defer to a human operator for selection of certain other rules or rule parameters or other aspects. An embodiment can select an entire set of rules, complete with any applicable parameters, and can perform entity resolution in accordance with that rule set, entirely on its own. An embodiment also may synthesize a rule, without referring to any selection from any predefined set of candidate rules, and can validate or refine that rule in accordance with the inventive techniques disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
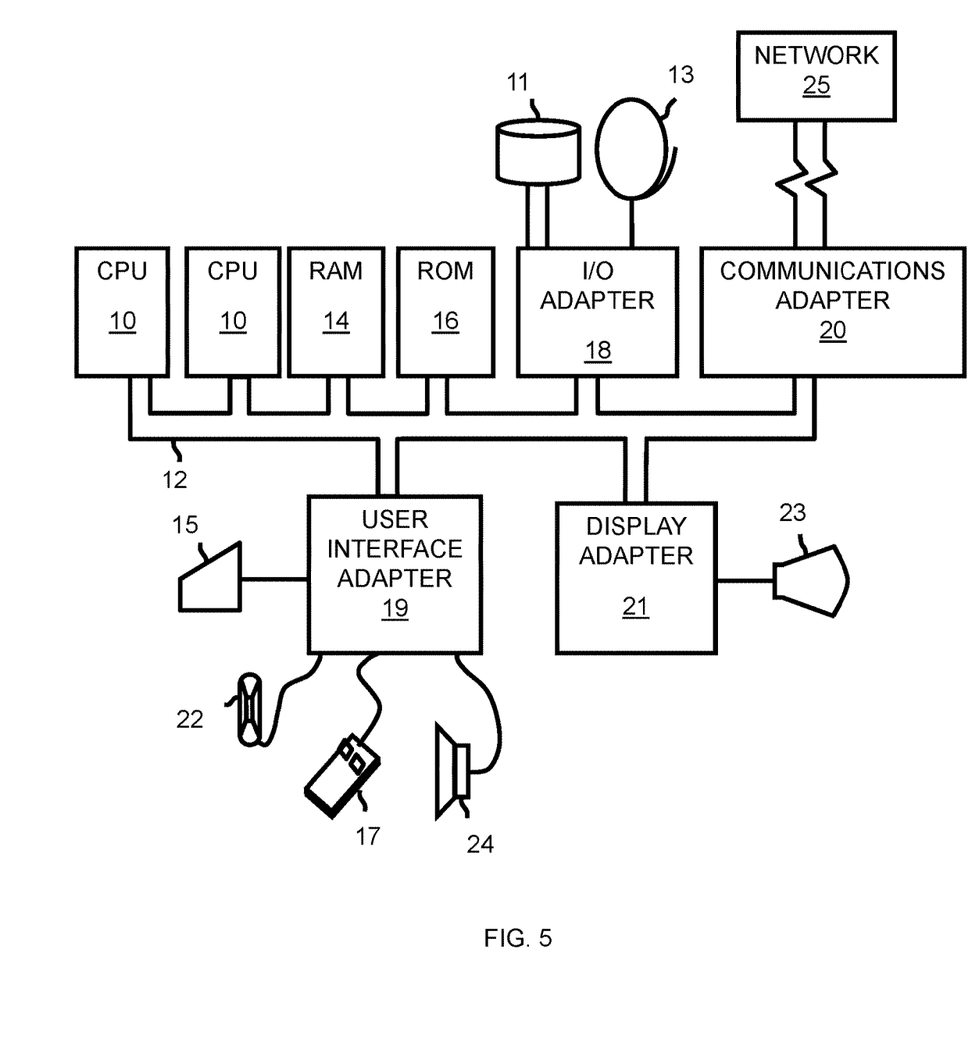
FIG. 5 is a diagram illustrating a computer program product according to an embodiment of the present invention.

Referring now to FIG. 5, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 14 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving a first data set by one or more first interfaces, the first data set including observations of a first entity and observations of a second entity;
   receiving a second data set by one or more second interfaces, the second data set indicating a criterion applicable to the first entity and the second entity;
   selecting a first candidate rule based on a class of at least one of the first entity and the second entity;
   applying the first candidate rule to the first data set by an entity analytics engine to generate a first candidate relationship between the first entity and the second entity;
   determining by a processor whether according to the criterion the first candidate relationship matches a relationship represented in the second data set;
   modifying autonomously the first candidate rule by a machine learning system so that a second candidate rule is generated, the machine learning system having been trained via repeating applications of rule sets, the machine learning system involving statistical methods associated with frequency, exclusivity and trust measures, wherein to generate the second candidate rule the machine learning system iteratively applies one or more modified rule sets until a second candidate relationship generated by the entity analytics engine matches the relationship represented in the second data set, the iterative application comprising implementing a frequency vs. exclusivity graph to one or more entity features and selecting the second candidate rule from a line that runs between entries along the frequency vs. exclusivity graph, the frequency vs. exclusivity graph illustrating the line, the frequency of entities per their occurrence, and the exclusivity of the occurrence per entity;
   in response to the first candidate relationship not matching the relationship represented in the second data set, replacing the first candidate rule with the second candidate rule;
   saving the second candidate rule;
   determining a confidence score for the second candidate rule;
   in response to the confidence score being lower than a preconfigured threshold, prompting a user to select a third candidate rule to replace the second candidate rule; and
   deploying the third candidate rule in a deployment rule set for analytics on new data sets.

2. The method according to claim 1, wherein the relationship between the first entity and the second entity is an identity relationship and defines a respective identity of both the first entity and the second entity.

3. The method according to claim 1, wherein:
   the second data set includes an acceptable range of quantities of relationships of a first type, and
   the criterion defines the acceptable range.

4. The method according to claim 1, wherein the relationship between the first entity and the second entity is a behavioral relationship.

5. The method according to claim 1, wherein the relationship between the first entity and the second entity is no relationship.

6. The method according to claim 1, wherein the second candidate rule is generated via a heuristic.

7. The method according to claim 1, wherein to generate the second candidate rule the machine learning system iteratively applies the one or more modified rule sets to the first data set.

8. The method according to claim 1, wherein the criterion includes a number of attempts to determine one or more rules.

9. The method according to claim 1, wherein said replacing of the first candidate rule with the second candidate rule comprises modifying user-specified parameters of the first candidate rule.

10. The method according to claim 1, wherein the exclusivity comprises a first exclusivity of a feature per entity.

11. The method according to claim 1, wherein the frequency comprises a first frequency with which the first entity or the second entity can have a given feature.

12. The method according to claim 1, wherein the frequency and the exclusivity reflect a frequency range and an exclusivity range, respectively.

13. The method according to claim 1, wherein the iterative application of the one or more modified rule sets to generate the second candidate rule further comprises the machine learning system applying multiple modified rules and comparing outcomes of the multiple modified rules being applied individually and the multiple modified rules being applied together.

14. The method according to claim 1, wherein the line comprises a curve.

15. The method according to claim 1, wherein the line comprises a straight line.

16. The method according to claim 1, wherein the line is part of a group of multiple lines within the frequency vs. exclusivity graph.

17. A method comprising:
   receiving a first data set by an interface, the first data set including observations of a first entity and observations of a second entity;
   receiving a second data set by the interface, the second data set including data indicative of a specific relationship between the first entity and the second entity;
   selecting a first candidate rule from a list relevant to the observations of the first entity and relevant to the observations of the second entity, rules being arranged in the list according to rule trustworthiness;
   applying the first candidate rule to the first data set by an entity analytics engine to generate a first candidate relationship between the first entity and the second entity;
   determining by a processor whether according to a criterion the first candidate relationship matches the specific relationship represented in the second data set, the criterion including a determination of the specific relationship between the first entity and the second entity;

generating a second candidate rule by autonomously modifying the first candidate rule, the generating comprising a machine learning system iteratively applying one or more modified rule sets until a second candidate relationship generated by the analytics engine matches the specific relationship represented in the second data set, the machine learning system involving statistical methods associated with frequency, exclusivity and trust measures, the machine learning system having been trained via repeating applications of rule sets, the iterative application comprising implementing a frequency vs. exclusivity graph to one or more entity features and selecting the second candidate rule from a line that runs between entries along the frequency vs. exclusivity graph, the frequency vs. exclusivity graph illustrating the line, the frequency of entities per their occurrence, and the exclusivity of the occurrence per entity;

saving the second candidate rule;

determining a confidence score for the second candidate rule;

in response to the first candidate relationship not matching the specific relationship represented in the second data set, replacing the first candidate rule with the second candidate rule;

in response to the confidence score being lower than a preconfigured threshold, prompting a user to select a third candidate rule to replace the second candidate rule; and deploying the third candidate rule in a deployment rule set for analytics on new data sets.

18. The method according to claim 17, wherein the specific relationship between the first entity and the second entity is an identity relationship and defines a first identity of the first entity and a second identity of the second entity.

19. The method according to claim 17, wherein the line comprises a curve.

20. A computer program product comprising:
  a computer readable storage medium having stored thereon:
    first program instructions executable by a device to cause the device to receive a first data set, the first data including observations of a first entity and observations of a second entity;
    second program instructions executable by the device to cause the device to receive a second data set, the second data set indicating a criterion applicable to the first entity and the second entity;
    third program instructions executable by the device to cause the device to select a first candidate rule based on a class of at least one of the first entity and the second entity;
    fourth program instructions executable by the device to cause the device to apply the first candidate rule to the first data set to generate a first candidate relationship between the first entity and the second entity;
    fifth program instructions executable by the device to cause the device to determine whether according to the criterion the first candidate relationship matches a relationship represented in the second data set;
    sixth program instructions executable by the device to cause the device to modify autonomously the first candidate rule by a machine learning system so that a second candidate rule is generated, the machine learning system having been trained via repeating applications of rule sets, the machine learning system involving statistical methods associated with frequency, exclusivity and trust measures, wherein to generate the second candidate rule the machine learning system iteratively applies one or more modified rule sets until a second candidate relationship generated by the entity analytics engine matches the relationship represented in the second data set, the iterative application comprising implementing a frequency vs. exclusivity graph to one or more entity features and selecting the second candidate rule from a line that runs between entries along the frequency vs. exclusivity graph, the frequency vs. exclusivity graph illustrating the line, the frequency of entities per their occurrence, and the exclusivity of the occurrence per entity;
    seventh program instructions executable by the device to cause the device to, in response to the first candidate relationship not matching the relationship represented in the second data set, replace the first candidate rule with the second candidate rule;
    eighth program instructions executable by the device to cause the device to save the second candidate rule;
    ninth program instructions executable by the device to cause the device to generate a confidence score for the second candidate rule;
    tenth program instructions executable by the device to cause the device to, in response to the confidence score being lower than a preconfigured threshold, prompt a user to select a third candidate rule to replace the second candidate rule; and
    eleventh program instructions executable by the device to cause the device to deploy the third candidate rule in a deployment rule set for analytics on new data sets.

\* \* \* \* \*